Dec. 31, 1946.  R. M. CARPENTER  2,413,544
CUTTING TOOL
Filed March 17, 1945  2 Sheets-Sheet 2
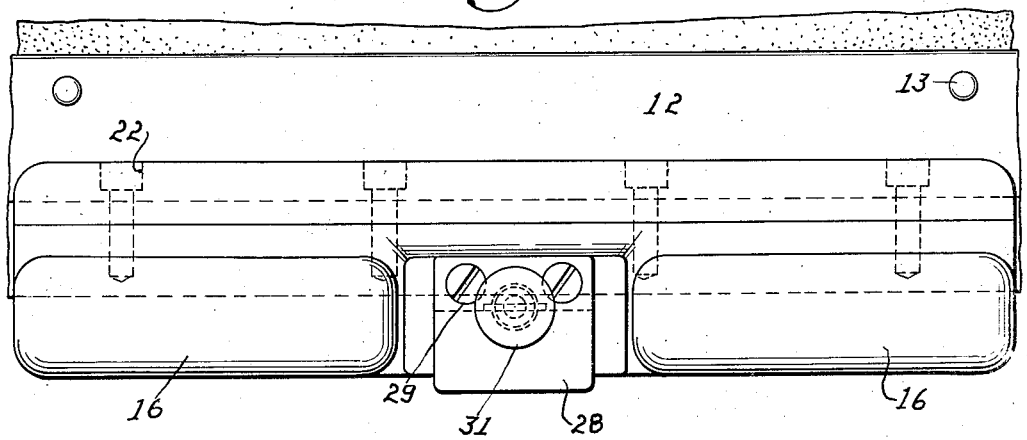
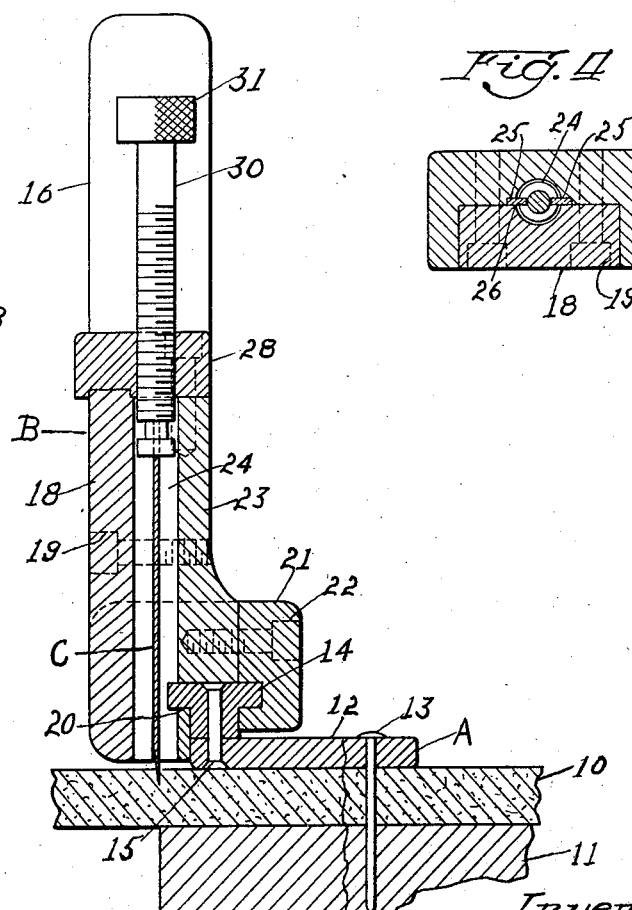
Inventor:
Richard M. Carpenter
By Joseph Harris
Atty.

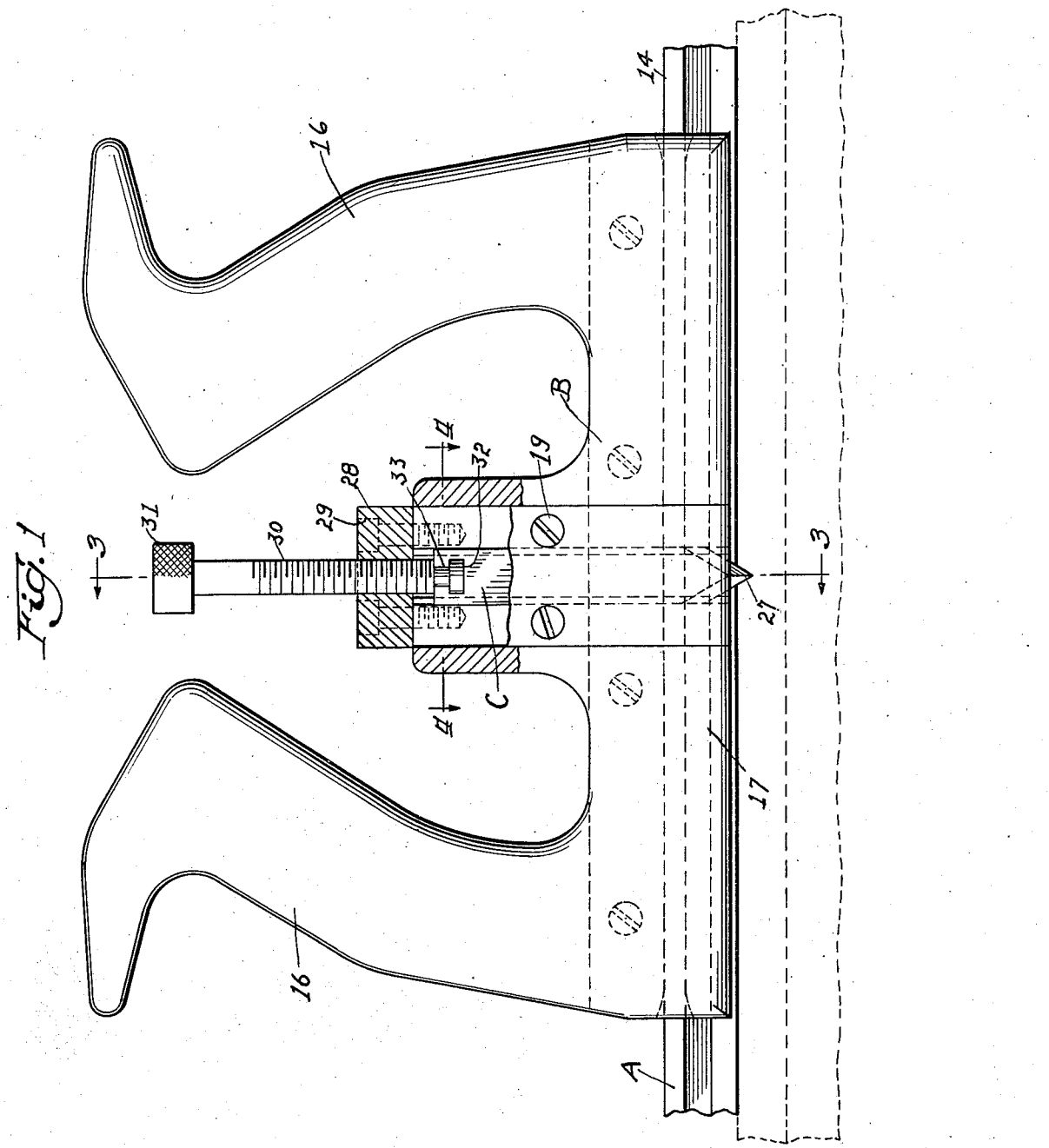

Patented Dec. 31, 1946

2,413,544

UNITED STATES PATENT OFFICE 2,413,544

CUTTING TOOL

Richard M. Carpenter, Chicago, Ill., assignor to Flexible Steel Lacing Company, Chicago, Ill., a corporation of Illinois Application March 17, 1945, Serial No. 583,344

2 Claims. (Cl. 164—73)

This invention relates to improvements in a cutting tool and, more especially but not exclusively, cutters for trimming or shearing machinery belts and conveyors of leather, fabric, rubber and like materials.

One object of the invention is to provide a tool for cutting belts and the like wherein the cutting tool is provided with a straight edge or guide that may be nailed or otherwise secured in position on the material to be cut and the supporting table or bench and on which guide is reciprocably, slidably mounted a carrier for the cutting blade.

Another object of the invention is to provide a cutter of the general type indicated in the preceding paragraph wherein the cutting blade is readily adjustable for depth of cuts by mechanical means on the carrier and which means hold the blade in adjusted position so that the operator is required only to actuate the carrier back and forth without having to expend any of his effort in holding the blade during a cutting movement.

Still another object of the invention is to provide a cutting tool of the character indicated wherein a staunch and rigid guide is provided for the knife blade in all of its adjustable positions.

More specific objects of the invention are to provide a cutting tool for belts and the like which is portable; is adapted to cut belts of all commercial thicknesses; to cut belts of widths up to the full length of the guide; and to provide a tool economical to manufacture and simple to operate.

Other objects of the invention will more clearly appear from the description following and appended claims.

In the drawings forming a part of this specification, Figure 1 is a front elevation of a cutting tool embodying one form of the invention. Figure 2 is a top plan of the tool shown in Figure 1. Figure 3 is a vertical section on the line 3—3 of Figure 1. And Figure 4 is a detail horizontal section corresponding to line 4—4 of Figure 1.

In said drawings, the belt or other material to be cut is indicated at 10, the same being supported on a table, bench or other suitable flat supporting member 11.

The improved cutting tool, as shown, comprises, broadly, a clamping guide plate A; a carrier B; a cutting blade C and means, hereinafter described for adjusting the depth of cut of the blade C.

The plate A, as shown, is preferably comprised of a flat plate 12 of the desired length for the maximum width of article to be cut and of substantial width to secure the article in clamped position. The plate 12 may be secured in operative position by any suitable means such as nails 13 entered through holes provided therein and driven through the belt or other material into the support when the latter is of suitable material to receive the nails. Obviously, C clamps or equivalent may be used to secure the belt and guide plate to the supporting member 11. To provide a retaining guide for the carrier B, the plate 12 is provided with a preferably T shaped guide rail 14 extending the length of the plate 12 and secured to the latter by any suitable means such as the rivets 15.

The carrier B, as shown, is preferably in the form of a suitable casting with upstanding, laterally spaced handles 16—16 and bottom horizontal section 17 recessed, vertically, at the center on the front for reception of a securing plate 18 attached by screws 19—19. The carrier B is formed with a bottom horizontal slot 20 to receive the forwardly extended flange of the T guide rail 14 and the slidable tongue and groove connection is completed by a bar 21 secured to the carrier casting by screws 22 and suitably horizontally grooved to receive the rearwardly extended flange of the T guide rail 14.

Referring more particularly to Figures 3 and 4, the said securing plate 18 and the rear wall 23 of the main casting are complementally vertically recessed, as indicated at 24 to provide a cylindrical opening. Also two thin vertical, opposed guide recesses 25—25 are formed in communication with the opening 24 and within said recesses 25—25 is vertically slidable and guided to within close proximity of the material to be cut, the knife blade 26. The latter, at its bottom end, is sharpened with a bevel on both sides of its width to put the cutting edge in the center as shown at 27 in Figures 1 and 3.

To provide for easy vertical adjustment of the blade 26, the following arrangement is preferably employed. A cap plate 28 is tongued and grooved to the securing plate 18 and retained in position by screws 29—29 entered into the main carrier casting. Said plate 28 is threaded to receive the vertical adjusting screw 30 having a knurled head 31 to facilitate hand turning. At its lower end, the screw 30 has an annular spaced collar 32 cooperable with a T slot 33 formed in the upper end of the knife blade to thereby provide a swivel connection.

From the preceding description, it will be seen that the improved cutting tool is adapted to operate on belts and the like of a width up to at least the full length of the guide-clamping plate A, since either end of the carrier B can be extended beyond the guide-clamping plate and still be effectively guided and retained thereby. By making the guide strip A of a length exceeding the maximum width of belt to be cut by an amount approximately the length of the carrier B the knife blade may be located otherwise than at the center as shown and still be effective to cut the entire width of belt, as will be obvious. Further, the vertical position of the cutting edge of the knife blade can be readily adjusted between strokes so as to gradually increase the depth of the cut which is particularly important when cutting thick belts or the like where it is impractical to sever the belt with a single cut. Also, because the knife blade is held in any adjusted position, the operator can devote all of his energy to the pushing or pulling of the carrier with its cutter across the material being cut instead of having to apportion part of his energy to pressing down the cutter into the material as has heretofore been customary in belt cutters.

Although there has been shown and described what is now considered the preferred embodiment of the invention, the same is merely illustrative and all changes and modifications are contemplated that come within the scope of the appended claims.

What is claimed is:

1. A portable cutting tool of the character described, comprising: a clamping guide plate adapted to be temporarily secured on the material to be cut and to a supporting table or the like; a carrier, the latter including a main casting, a detachable front securing plate and a detachable cap plate, said casting and front plate being complementally recessed to provide a vertical opening and opposed guide recesses communicating with said opening, the cap plate being disposed at the top of said opening; cooperable means on said carrier and guide plate for guiding and retaining the carrier in movement parallel with the guide plate; a knife blade disposed in said carrier opening and with its edges in said guide recesses; and an adjusting screw mounted in said cap plate and having swivel connection with the knife blade for vertically adjusting the latter.

2. A portable tool for cutting belts and the like, comprising: an elongated guide plate adapted to be placed on and retain the material to be cut; a carrier; cooperable guiding and retaining means on the guide plate and carrier adapting the carrier to be freely reciprocated back and forth on the guide plate; a handle on the carrier by which it may be reciprocated; a knife blade vertically adjustable on the carrier; an adjusting screw; cooperable means on the screw and knife blade by which the blade may be vertically adjusted and retained in adjusted position, said carrier including a main casting and a detachable securing plate complementally recessed to accommodate the knife blade and guide the latter.

RICHARD M. CARPENTER.